(12) United States Patent
Ma et al.

(10) Patent No.: US 10,725,233 B2
(45) Date of Patent: Jul. 28, 2020

(54) BACKLIGHT MODULE AND DISPLAY MODULE

(71) Applicant: BOE TECHNOLOGY GROUP CO., LTD., Beijing (CN)

(72) Inventors: Yongda Ma, Beijing (CN); Yong Qiao, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/066,835

(22) PCT Filed: Nov. 14, 2017

(86) PCT No.: PCT/CN2017/110862
§ 371 (c)(1),
(2) Date: Jun. 28, 2018

(87) PCT Pub. No.: WO2018/090899
PCT Pub. Date: May 24, 2018

(65) Prior Publication Data
US 2019/0011632 A1      Jan. 10, 2019

(30) Foreign Application Priority Data

Nov. 17, 2016   (CN) ..................... 2016 2 1234866 U

(51) Int. Cl.
*G02B 6/00*       (2006.01)
*F21V 8/00*       (2006.01)
*G02F 1/1333*     (2006.01)

(52) U.S. Cl.
CPC ......... *G02B 6/0088* (2013.01); *G02B 6/0086* (2013.01); *G02B 6/005* (2013.01);
(Continued)

(58) Field of Classification Search
CPC .. G02B 6/0086; G02B 6/0088; G02B 6/0093; G02B 6/005; G02B 6/0051;
(Continued)

(56) References Cited

U.S. PATENT DOCUMENTS

2005/0099604 A1\* 5/2005 Mizumaki ............ G02B 6/0086
                                                      353/27 R
2006/0098459 A1   5/2006 Kao
(Continued)

FOREIGN PATENT DOCUMENTS

CN      102192448 A      9/2011
CN      202484901 U     10/2012
(Continued)

OTHER PUBLICATIONS

International Search Report of PCT/CN2017/110862 in Chinese, dated Feb. 12, 2018 with English translation.
(Continued)

*Primary Examiner* — Y M. Quach Lee
(74) *Attorney, Agent, or Firm* — Collard & Roe, P.C.

(57) ABSTRACT

A backlight module and a display module are disclosed. The backlight module includes: a back plate and an optical component, wherein at least one positioning structure is disposed on the back plate, the optical component is provided with an opening which is matched with the positioning structure, and a surface of the positioning structure facing an inner wall of the opening is a curved surface. The backlight module can reduce or avoid the deformation of the positioning structure when being subjected to an external force.

17 Claims, 4 Drawing Sheets

(52) U.S. Cl.
CPC .......... *G02B 6/0051* (2013.01); *G02B 6/0093* (2013.01); *G02F 2001/133314* (2013.01)

(58) Field of Classification Search
CPC ............. G02F 1/1333; G02F 1/133308; G02F 2001/13332; G02F 2001/133314; G02F 2001/133322
See application file for complete search history.

(56) References Cited

U.S. PATENT DOCUMENTS

| | | | |
|---|---|---|---|
| 2007/0171323 A1* | 7/2007 | Lin .................... | G02F 1/133308 362/606 |
| 2011/0103092 A1* | 5/2011 | Matsui ................. | G02B 6/0091 362/612 |
| 2012/0170311 A1 | 7/2012 | Huang et al. | |
| 2012/0194760 A1* | 8/2012 | Fukuda ............. | G02F 1/133308 349/58 |
| 2012/0314141 A1* | 12/2012 | Kuromizu ......... | G02F 1/133615 348/790 |
| 2014/0204607 A1* | 7/2014 | Yan ..................... | G02B 6/0031 362/606 |
| 2015/0124482 A1* | 5/2015 | Kuromizu ............ | G02B 6/0088 362/611 |
| 2015/0285989 A1* | 10/2015 | Lee ................... | G02F 1/133308 362/611 |

FOREIGN PATENT DOCUMENTS

| | | |
|---|---|---|
| CN | 202757067 U | 2/2013 |
| CN | 103256518 A | 8/2013 |
| CN | 105627190 A | 6/2016 |
| CN | 206162015 U | 5/2017 |

OTHER PUBLICATIONS

Notice of Transmittal of the International Search Report of PCT/CN2017/110862 in Chinese, dated Feb. 12, 2018.
Written Opinion of the International Searching Authority of PCT/CN2017/110862 in Chinese, dated Feb. 12, 2018 with English translation.

* cited by examiner

BACKLIGHT MODULE AND DISPLAY MODULE

CROSS REFERENCE TO RELATED APPLICATIONS

This application is the National Stage of PCT/CN2017/110862 filed on Nov. 14, 2017, which claims priority under 35 U.S.C. § 119 of Chinese Application No. 201621234866.X filed on Nov. 17, 2016, the disclosure of which is incorporated by reference.

TECHNICAL FIELD

Embodiments of the present disclosure relate to a field of display technology, especially relate to a backlight module and a display module.

BACKGROUND

The backlight module is a component that provides a light source for a display screen of an electronic device such as a liquid crystal display. Currently, it has been widely used for various electronic devices having the display screen, and especially it is more popular to be used in the liquid crystal display device.

The backlight module typically includes a back plate, a light guide plate, an optical film and a positioning structure disposed on the back plate for positioning the light guide plate and the optical film etc. However, the positioning structure is prone to be deformed when it is subjected to external forces.

SUMMARY

Embodiments of the present disclosure provide a backlight module and a display module, in order to solve the problem that the positioning structure is prone to be deformed.

In first aspect of the present disclosure, there is provided a backlight module, comprising: a back plate and an optical component, wherein at least one positioning structure is disposed on the back plate, the optical component is provided with an opening which is matched with the positioning structure, and a surface of the positioning structure facing an inner wall of the opening is a curved surface.

In second aspect of the present disclosure, there is provided a display module, comprising the above backlight module.

BRIEF DESCRIPTION OF THE DRAWINGS

In order to clearly illustrate the technical solution of the embodiments of the invention, the drawings to be used in the description of the embodiments or the prior art will be briefly described in the following; it is obvious that the described drawings are only related to some embodiments of the invention, those skilled in the art can also obtain other drawing(s) without any inventive work.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
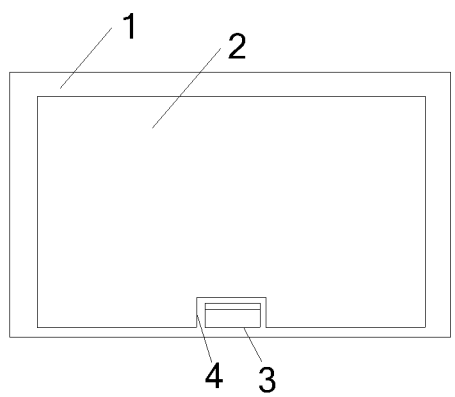
FIG. 1 schematically illustrates a top view of a backlight module.

FIG. 1 schematically illustrates a top view of a backlight module. The backlight module comprises a back plate 1 and a light guide plate 2; an edge of the back plate 1 is bent to form a receiving space, the light guide plate 2 is disposed in the receiving space formed by the back plate 1. A positioning structure 3 is disposed on the back plate 1, the light guide plate 2 is provided with a groove 4 which is matched with the positioning structure 3 thus, the light guide plate 2 is positioned by the assembly between the positioning structure 3 and the groove 4. The surface of the positioning structure 3 facing the groove 4 of the light guide plate 2 is a flat surface.

Figure 2:
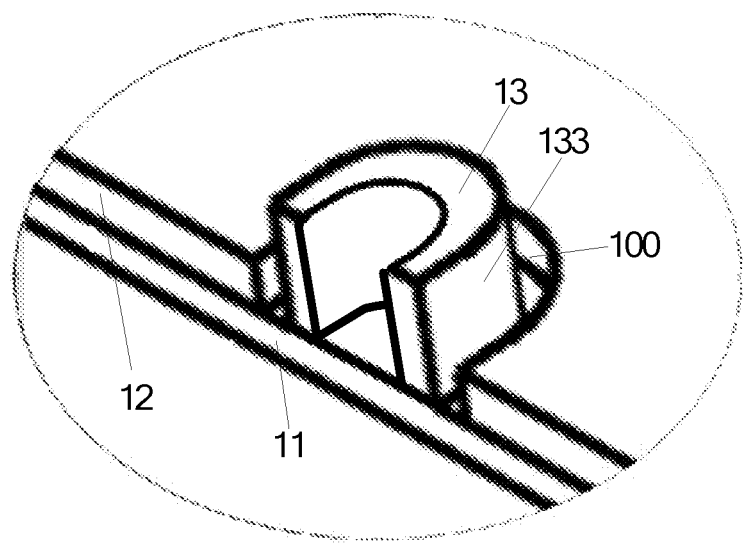
FIG. 2 schematically illustrates a partial perspective view of a backlight module according to an embodiment of the present disclosure.
Figure 3:
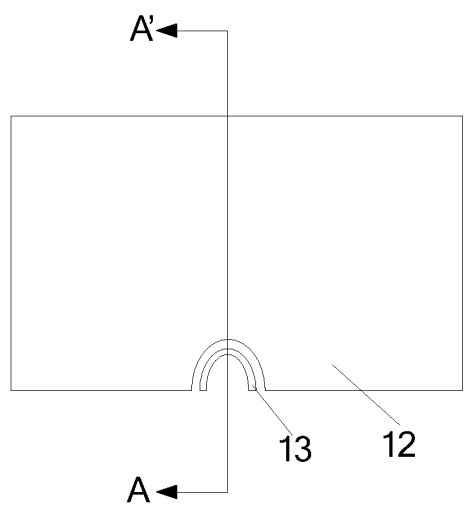
FIG. 3 schematically illustrates a top view of a backlight module according to an embodiment of the present disclosure.
Figure 4:
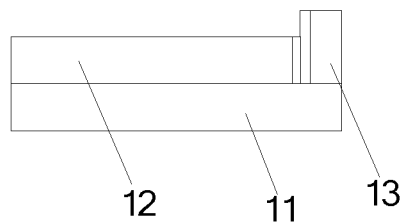
FIG. 4 schematically illustrates a cross-sectional view along A-A' line of FIG. 3 according to an embodiment of the present disclosure.

According to an embodiment of the present disclosure, there is provided a backlight module, as illustrated in FIGS. 2, 3 and 4. FIG. 2 schematically illustrates a partial perspective view of a backlight module according to an embodiment of the present disclosure, FIG. 3 schematically illustrates a top view of a backlight module according to an embodiment of the present disclosure, and FIG. 4 schematically illustrates a cross-sectional view along A-A' line of FIG. 3 according to an embodiment of the present disclosure.

The backlight module according to an embodiment of the present disclosure comprises: a back plate 11 and an optical component 12 disposed on the back plate 11. The back plate 11 is provided with at least one positioning structure 13, and the optical component 12 is provided with an opening 100 which is matched with the positioning structure 13. The surface 133 (hereinafter referred to as side surface) of the positioning structure 13 facing an inner wall of the opening 100 is a curved surface.

Because the surface of the positioning structure facing the optical component is a curved surface, in the case that the positioning structure is subjected to an external force, the external force can be converted into a pressing force against the curved surface, thus the positioning structure can be withstood more external force, and therefore the backlight module provided in embodiments of the present disclosure can reduce or avoid the deformation of the positioning structure.

In at least some embodiments, the optical component 12 comprises: at least one of a light guide plate and an optical film.

That is, in embodiments of the present disclosure, the optical component 12 may be a light guide plate, an optical film, or may comprise both a light guide plate and an optical film. In other embodiments, the optical film may comprise at least one of a diffusion film, a polarizing film, a uniform illumination film, and the like.

In at least some embodiments, a first end (i.e., bottom) of the positioning structure 13 is connected with the back plate 11, a second end (i.e., top) of the positioning structure 13 is extended along a direction perpendicular to a plane of the back plate 11. In other embodiments, the second end of the positioning structure 13 is extended along a light outputting direction, or the second end of the positioning structure 13 is extended along an inclined direction with respect to the plane of the back plate, for example, the inclination angle is ranged from 5 degrees to 85 degrees.

In at least some embodiments, a projection of the curved surface on the plane of the back plate is in non-linear shape. For example, the non-linear shape includes an arc, a zigzag and a wavy line.

As illustrated in FIGS. 2, 3 and 4, embodiments of the present disclosure are described by taking an example of the side surface 133 of the positioning structure 13 being in an arc shape. However, the embodiment of the present disclosure is not limited thereto, and based on the above embodiments herein, those skilled in the art may also choose the side surface 133 of the positioning structure 13 in other shapes, for example, a pyramid surface comprised of two planes, or a wavy curved surface.

As illustrated in FIG. 2, the projection of the positioning structure 13 on the plane of the back plate 11 is U-shaped.

In at least some embodiments, a connection between the first end of the positioning structure 13 and the back plate 11 may be at least one of a screw connection, a rivet connection, a hook connection and a welding connection, and it is not limited thereto.

In the present disclosure, embodiments are described only by taking an example that the backlight module comprises one positioning structure 13, but the embodiments of the present disclosure are not limited thereto, and those skilled in the art can also choose the number of positioning structures to be others, such as two, three, etc. Additionally, in embodiments of the present disclosure, the position of the positioning structure 13 on the backlight module is not limited, that is, the positioning structure 13 may be disposed at any position of the back plate. In at least some embodiments, the positioning structure 13 is disposed on an edge of the back plate. For example, the back plate is provided with at least two positioning structures, which are disposed on the edge of the back plate. In this case, the opening of the optical component comprises at least two notches disposed on the edge of the optical component. The shapes of each notch and each positioning structure on the back plate are matched with each other, so as to allow the positioning structures to pass through the notches.

In at least some embodiments, the back plate 11 and the positioning structure 13 are integrated structure.

The back plate 11 and the positioning structure 13 are integrated structure, which can not only save the two processes of separately manufacturing the positioning structure 13 and the back plate 11, but also can make the connection between the positioning structure and the back plate more stable. In this way, the back plate 11 and the positioning structure 13 are integrated structure, which can reduce the production cost and improve the reliability of the backlight module.

Figure 5:
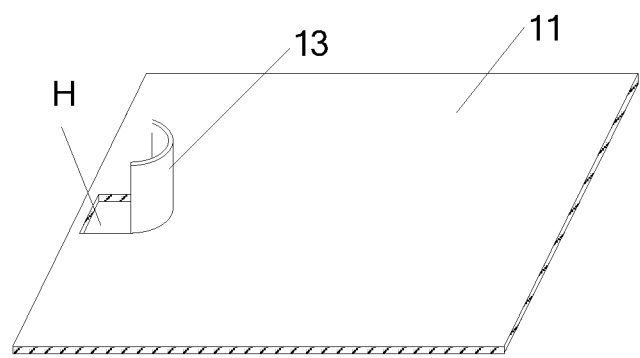
FIG. 5 schematically illustrates a back plate according to an embodiment of the present disclosure.

In at least some embodiments, the positioning structure is formed by bending a portion of the back plate. For example, as illustrated in FIG. 5, the positioning structure 13 may be a sheet-metal bent component formed of bending a portion the back plate 11 by a sheet-metal machining technology.

As an example, a specific process of manufacturing the positioning structure 13 on the back plate 11 by the sheet-metal machining technology comprises: firstly, cutting a piece of sheet material at the position where the positioning structure is to be formed on the back plate (for example, the sheet material at the opening H), and keeping a part of the sheet material connecting with the back plate; secondly, bending the sheet material, for example, the sheet material is bent toward a direction perpendicular to the plane of the back plate; finally, stamping the bent sheet material, so as to form a required curved surface.

In at least some embodiments, a surface of the positioning structure facing an inner wall of the opening of the optical component is one of a concave surface and a convex surface, a surface of the inner wall of the opening of the optical component is the other of the concave surface and the convex surface, and the shapes of the concave surface and the convex surface are matched with each other. The curvature of the concave surface and the convex surface is substantially equal to each other.

For example, in the above embodiments, a first arc-shaped surface is the surface of the sheet-metal bent component toward the optical component (such as the light guide plate), and a second circular arc-shaped surface is the end surface (or inner wall) of the opening of the optical component facing the first arc-shaped surface; the curvature of the first arc-shaped surface and the second arc-shaped surface are equal or approximately equal to each other at their positions.

It is noted that, in the above embodiments, the curvature of the first arc-shaped surface and the second arc-shaped surface may be completely equal to each other at their positions, or they may be approximately equal to each other. Because in the actual manufacturing process, a manufacturing tolerance may present in forming the first arc-shape surface and the second arc-shaped surface, when their curvature at their positions are within an acceptable tolerance range, it is considered that the curvature of the first arc-shaped surface and the second arc-shaped surface are equal or approximately equal at their positions.

In at least some embodiments, two following implementation for the first and second arc-shaped surface are provided.

Figure 6:
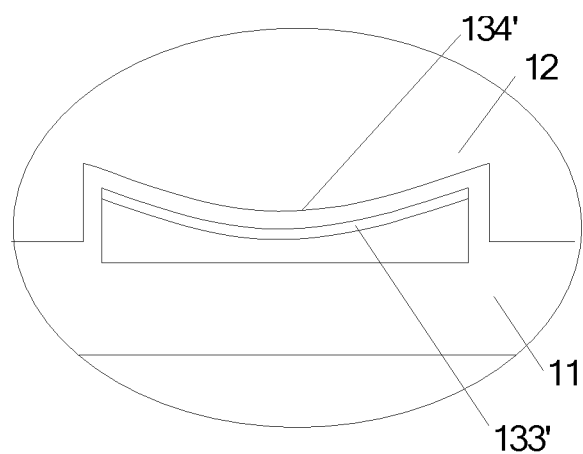
FIG. 6 schematically illustrates a positioning structure according to an embodiment of the present disclosure.

As illustrated in FIG. 6, the first arc-shaped surface 133' is a concave surface, and the second arc-shaped surface 134' is a convex surface whose curvature is equal to or approximately equal to the curvature of the first arc-shaped surface 133'.

Figure 7:
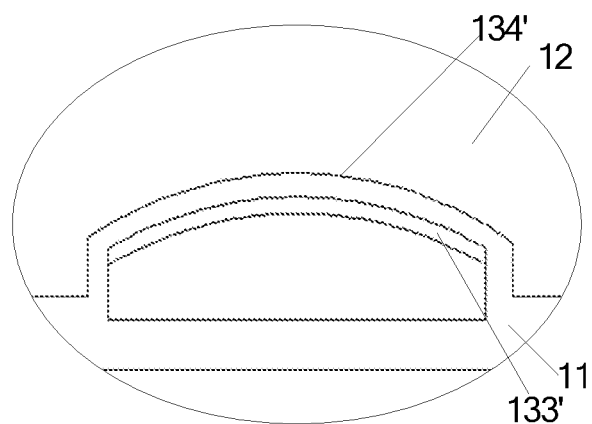
FIG. 7 schematically illustrates another positioning structure according to an embodiment of the present disclosure.

As illustrated in FIG. 7, the first arc-shaped surface 133' is a convex surface, and the second arc-shaped surface 134' is a concave surface whose curvature is equal to or approximately equal to the curvature of the first arc-shaped surface 133'.

In at least some embodiments, there is a space between the convex surface and the concave surface, thus the external force can be prevented from directly acting on the positioning structure through the optical component.

In the above embodiments, the side surface of the positioning structure 13 and the end surface (or the inner wall) of the opening of the optical component 12 are designed as arc-shaped surface. When the optical component 12 is subjected to external force to press the positioning structure 13, partial expansion pressure can be absorbed by the arc-shaped surface, and then the force on the positioning structure is reduced and the reliability of the backlight module is increased.

In at least some embodiments, in a case that more than two positioning structures are disposed on the back plate, a part of the positioning structures is as illustrated in FIG. 6, and the other part of the positioning structures is as illustrated in FIG. 7. That is, in a case that at least two positioning structures 13 are disposed on the back plate 11, the side surface of one of the positioning structures is the convex surface, and the side surface of the other positioning structures is the concave surface. By using the convex surface and the concave surface together, the force on the positioning structure can be further reduced, and the reliability of the backlight module can be further increased.

Figure 9:
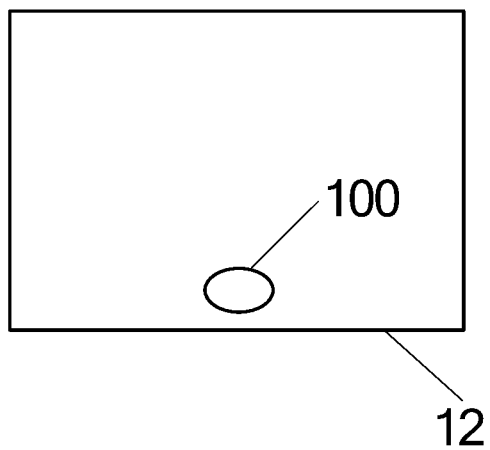
FIG. 9 schematically illustrates a top view of an optical component according to an embodiment of the present disclosure.

In at least some embodiments, the opening disposed in the optical component comprises at least one of a notch disposed on an edge of the optical component and a via hole disposed in the optical component. For example, as illustrated in FIGS. 2 and 3, the opening 100 is the notch disposed on the edge of the optical component 12. For another example, as illustrated in FIG. 9, the opening 100 is the via hole disposed in the optical component, the via hole is in a closed shape, for example, it is in a regular shape or an irregular shape such as an ellipse, a circle, or a square etc., which will not be elaborated herein.

Figure 8:
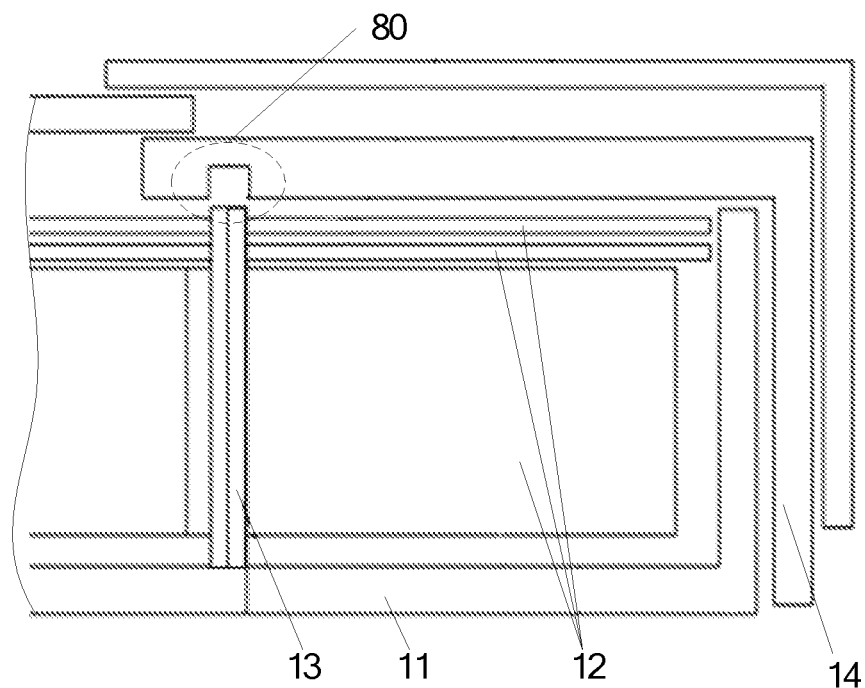
FIG. 8 schematically illustrates a backlight module according to an embodiment of the present disclosure.

As illustrated in FIG. 8, FIG. 8 schematically illustrates a cross-sectional view of a backlight module according to an embodiment of the present disclosure. The backlight module provided in any one of the above embodiments further comprises a frame 14 disposed on the optical component 12; the frame 14 is provided with a groove 80 which is configured to receive the second end of the positioning structure 13.

Relative to the surface of the back plate 11, a top surface of the second end of the positioning structure is higher than the top surface of the optical component, and the shape of the groove 80 is matched with the shape of the second end of the positioning structure 13. The length of the positioning structure 13 is greater than the thickness of the optical component 12.

In embodiments of the present disclosure, the groove 80 is disposed on the frame 14, and the shape of the groove 80 is matched with the shape of the second end of the positioning structure 13, so that the second end of the positioning structure 13 can be received in the groove 80 of the frame 14. In a case that the positioning structure 13 is pressed by external force, the external force can be distributed to the first end fixed to the back plate 11 and the second end received in the groove 80 of the frame 14, and thus the deformation of the positioning structure can be further avoided according to embodiments of the present disclosure.

According to an embodiment of the present disclosure, there is provided a display module, which comprises a backlight module provided in any one of the above embodiments.

For example, the display module may be any product or component which has a display function, such as an electronic paper, a mobile phone, a table computer, a television, a monitor, a notebook computer, a digital photo frame, a navigator etc.

In the present disclosure, the following points needs to explain:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and a size of a layer or area may be enlarged or narrowed, that is, the drawings are not drawn in a real scale.

(3) In case of no conflict, features in one embodiment or in different embodiments can be combined as a new embodiment.

What is described above is related to the illustrative embodiments of the disclosure only and not limitative to the scope of the disclosure; the scopes of the disclosure are defined by the accompanying claims.

The invention claimed is:

1. A backlight module, comprising:
   a back plate;
   an optical component, provided with an opening; and
   at least one positioning structure, disposed on the back plate and configured for matching with the opening of the optical component, the at least one positioning structure comprising a first curved surface and a second curved surface,
   wherein the first curved surface is configured to be a convex surface facing towards an inner wall of the opening, the second curved surface is configured to be a concave surface facing away from the inner wall of the opening, and the concave surface is configured to be recessed from an edge of the back plate to a central region of the back plate,
   wherein the inner wall of the opening has an arched surface, a curvature of the arched surface, a curvature of the concave surface and a curvature of the convex surface are equal to one another, and
   wherein the opening is located in the optical component, and the opening is configured to be surrounded on all sides by the optical component, such that the opening has an enclosed shape in a plane of the optical component.

2. The backlight module according to claim 1, wherein a first end of the at least one positioning structure is connected with the back plate, a second end of the at least one positioning structure is extended along a direction perpendicular to a plane of the back plate.

3. The backlight module according to claim 2, wherein a projection of the first curved surface on the plane of the back plate is in non-linear shape.

4. The backlight module according to claim 3, wherein the non-linear shape comprises an arc.

5. The backlight module according to claim 1, wherein the back plate and the at least one positioning structure are integrated structure.

6. The backlight module according to claim 5, wherein the at least one positioning structure is formed by bending a portion of the back plate.

7. The backlight module according to claim 2, wherein the inner wall of the opening of the optical component has a shape matched with a shape of the first curved surface of the at least one positioning structure.

8. The backlight module according to claim 2, wherein a projection of the at least one positioning structure on the plane of the back plate is U-shaped.

9. The backlight module according to claim 1, wherein the back plate is provided with at least two positioning structures which are disposed on the edge of the back plate.

10. The backlight module according to claim 9, wherein the opening of the optical component comprises a notch disposed on an edge of the optical component.

11. The backlight module according to claim 2, wherein the backlight module further comprises a frame disposed on the optical component, the frame is provided with a groove, and the groove is configured to receive the second end of the at least one positioning structure.

12. The backlight module according to claim 11, wherein relative to a surface of the back plate, a top surface of the second end of the at least one positioning structure is higher than a top surface of the optical component, and a shape of the groove is matched with a shape of the second end of the at least one positioning structure.

13. The backlight module according to claim 1, wherein the optical component comprises at least one of a light guide plate and an optical film.

14. The backlight module according to claim 1, wherein the opening comprises a notch disposed on an edge of the optical component and a via hole disposed in the optical component.

15. A display module, comprising: the backlight module according to claim 1.

16. The backlight module according to claim 1, wherein the back plate is made from a sheet-metal material, and the at least one positioning structure is formed of a part of the back plate, the part of the back plate is configured to be bent toward a direction perpendicular to a plane of the back plate.

17. The backlight module according to claim 1, wherein the first curved surface and the second curved surface are on two opposite sides of the at least one positioning structure and have same curvature.

* * * * *